United States Patent [19]

Karl et al.

[11] Patent Number: 4,603,119

[45] Date of Patent: Jul. 29, 1986

[54] PROCESS FOR PRODUCTION OF ACTIVATED CARBON FROM LIGNITE COKE

[76] Inventors: Alfons Karl, Herzbergstr. 59, D-6466 Gründau 1; Erwin Walter, Karlstr. 33, D-6460 Gelnhausen; Peter Kleinschmit, Wildaustr. 19, D-6450 Hanau 9; Hermann Gottschlich, Breslauer Str. 16, D-5790 Brilon; Roland Kutz, Westfalenstr. 6, D-4800 Bielefeld 14; Detlev Koth, Karlesberg 8, D-8752 Mömbris, all of Fed. Rep. of Germany

[21] Appl. No.: 732,407

[22] Filed: May 9, 1985

[30] Foreign Application Priority Data

May 16, 1985 [DE]  Fed. Rep. of Germany ....... 3418150

[51] Int. Cl.$^4$ .................. B01J 20/20; C01B 31/12
[52] U.S. Cl. .................... 502/427; 502/417; 502/437
[58] Field of Search ............... 502/427, 437, 416, 417, 502/183, 184; 423/460

[56] References Cited

U.S. PATENT DOCUMENTS

| | | | |
|---|---|---|---|
| 3,492,244 | 1/1970 | Fujiwara et al. | 502/417 |
| 3,764,561 | 10/1973 | Nishino et al. | 502/427 |
| 3,817,874 | 6/1974 | Wennerberg et al. | 502/427 |
| 4,039,473 | 8/1977 | Shafer | 502/427 |
| 4,082,694 | 4/1978 | Wennerberg et al. | 502/427 |

OTHER PUBLICATIONS

Ullmanns Encyklopadie der Technischen Chemie, 4th Edition, vol. 14, pp. 623–626.
Happe, Chem. Techn. vol. 34 Jun. 192 pp. 298–300.
Bader, Aktivkohle und ihre Industrielle Anwendung (1980) pp. 71–74.

*Primary Examiner*—P. E. Konopka
*Attorney, Agent, or Firm*—Cushman, Darby & Cushman

[57] ABSTRACT

Activated carbon is produced from lignite coke. It is characterized by the product of the molasses number times the iodine number divided by 1000 being 350 to 1000 and/or the product of the molasses number times the methylene blue number divided by 10 being 500 to 1200. It is produced by adding aqueous alkali or alkaline earth carbonate solution and/or aqueous alkali or alkaline earth hydroxide solution by means of lance during the steam activation of lignite coke in a rotating tube.

4 Claims, No Drawings

PROCESS FOR PRODUCTION OF ACTIVATED CARBON FROM LIGNITE COKE

BACKGROUND OF THE INVENTION

It is known to carry out the activation of lignite coke in a rotary tube after the addition of 25% aqueous potassium carbonate (compare Chem. Techn. Volume 34 (1982), pages 298–300).

From Ullmann's Enzyklopädie der technischen Chemie, 4th edition, volume 14, pages 623, 625, and 626 there is known the gas activation of lignite coke with addition of solid potassium carbonate or potassium carbonate dissolved in water before the activation.

The known processes have the disadvantages that there cannot be obtained an especially finely pored activated carbon.

In the known processes the lignite coke is suspended in the aqueous catalyst solution before the true activation. Through this there is absorbed by the lignite coke a non-controllable amount of catalyst, depending on the quality of the lignite. The impregnated brown lignite coke of this type is filtered off in the known process, dried, and subjected to the actual activation.

Because the absorption on the catalyst cannot be controlled exactly, it is not possible to reproducibly produce a predetermined activated carbon quality.

Furthermore activated carbon produced according to the known process has the disadvantage that it is not particularly successful in the removal of chlorohydrocarbons in the preparation of drinking water from ground water or in the preparation of sewage.

SUMMARY OF THE INVENTION

The invention is directed to an activated carbon produced from lignite coke which is characterized by the product of the molasses number times the iodine number divided by 1000 being 350 to 1000, preferably 400–800 and/or the product of the molasses number times the methylene blue titer divided by the 10 being 500 to 1200, preferably 600–1000.

This characterization is characteristic for the specific combination of fine and coarse pores in the activated carbon of the invention.

The activated carbon of the invention in an advantageous manner exhibits better adsorption properties in the preparation of drinking water from ground water or in the preparation of sewage. Above all chlorohydrocarbons are excellently adsorbed and therewith removed from the water. Because of the higher abrasion hardness the activated carbons of the invention are better regenerable.

The activated carbons of the invention are particularly advantageously employed for the preparation of water to make it suitable as drinking water.

A further object of the invention is the development of a process for the production of the activated carbon from lignite coke in which the product of the molasses number times the iodine number divided by 1000 is 350 to 1000 and/or the product of the molasses number times the methylene blue titer divided by 10 is 500 to 1200 which comprises activating lignite coke with steam in a rotating tube and spraying aqueous alkali or alkaline earth carbonate solution and/or alkaline earth hydroxide solution into the rotating tube by means of a lance.

Thus there can be used sodium carbonate, potassium carbonate, magnesium carbonate, sodium hydroxide, potassium hydroxide, calcium hydroxide, barium hydroxide.

In a preferred illustrative form of the invention there is employed as alkali carbonate, potassium carbonate, or as alkali hydroxide, potassium hydroxide.

The potassium concentration based on the lignite employed can be 1.0 to 8.0 wt. %, preferably 1.5 to 6.0 wt. %.

As starting material there is employed in the process of the invention lignite coke. This lignite coke can be characterized by the following data:
Particle size: 0.5–4.0 mm
Ash content: 7.0±1.5 wt.-%
Volatile components: 3.0±0.5 wt.-%%
Fixed carbon: 87.5±3.0 wt.-%
Bulk density: 0.50±0.05 g/ml In a preferred illustrative form of the invention there is used as starting raw material a lignite coke which has the following physical and chemical properties:

| Particle Size | mm | Lignite Fine Coke 0.5–4.0 |
|---|---|---|
| Particle Composition: | | |
| >4.00 mm | wt. % | — |
| 4.00–3.15 mm | wt. % | 5.0 |
| 3.15–2.00 mm | wt. % | 25.0 |
| 2.00–1.00 mm | wt. % | 48.0 |
| 1.00–0.50 mm | wt. % | 22.0 |
| <0.50 mm | wt. % | — |
| | | 100.0 |
| Immediate Analysis: | | |
| Water content | wt. % | 2.5 ± 1.5 |
| Ash content | wt. % | 7.0 ± 1.5 |
| Volatile component | wt. % | 3.0 ± 0.5 |
| Fixed carbon | wt. % | 87.5 ± 3.0 |
| Heating value (Hu) | kcal/kg | 7,150 ± 200 |
| | KJ/kg | 30,000 ± 850 |
| Elemental Analysis (waf): | | |
| Carbon | wt. % | 88.2 ± 1.0 |
| Hydrogen | wt. % | 0.6 ± 0.2 |
| Sulfur | wt. % | 0.4 ± 0.15 |
| Oxygen | wt. % | } 0.8 ± 0.4 |
| Nitrogen | wt. % | |
| Oxide Analysis of the Coke Ash: | | |
| $SiO_2$ | wt. % | 6.0 ± 4.0 |
| $Al_2O_3$ | wt. % | 6.0 ± 3.0 |
| $Fe_2O_3$ | wt. % | 16.0 ± 8.0 |
| $SO_3$ | wt. % | 16.0 ± 4.0 |
| CaO | wt. % | 37.5 ± 7.5 |
| MgO | wt. % | 16.0 ± 4.0 |
| $Na_2O$ | wt. % | } 2.5 ± 1.0 |
| $K_2O$ | wt. % | |
| Physical Characteristics: | | |
| True density | $g/cm^3$ | 1.75 ± 0.1 |
| Bulk density | $g/cm^3$ | 0.50 ± 0.05 |
| Specific Surface area | $m^2/g$ | 200 ± 50 |
| Reactivity | $cm^3 CO_2$/ g. sec. | 2.8 |
| Electrical Resistance | Ohm · cm | 0.25 |
| Ignition point | °C. | 320 ± 20 |
| Crushing strength | $daN/cm^2$ | — |
| Ash Melting Behavior In Weakly Reducing Atmosphere: | | |
| Sintering point | °C. | ca. 1.050 |
| Softening point | °C. | ca. 1.440 |
| Hemispherical point | °C. | ca. 1.560 |
| Melting point | °C. | ca. 1.620 |

Inter alia the particular granulation of the lignite coke is essential. Thus for example finely powdered lignite coke cannot be employed in the rotary tube in the invention.

The activation process of the invention is carried out in a rotary tube. The heating of the rotary tube is carried out in known manner with a gas burner in which e.g. liquified gas such as butane or propane is burned. As activating agent steam is inserted in known manner into the rotary tube.

As catalyst there can be used aqueous potassium carbonate solution or aqueous potassium hydroxide, preferably in a concentration of 10 to 50 wt.%.

The addition of the aqueous alkali or alkaline earth carbonate or hydroxide solution can be carried out according to the invention via a lance which is constructed as a unary nozzle or a binary nozzle. The aqueous catalyst solution is sprayed on the lignite coke in the rotary tube during the activation by means of this lance.

Preferably the catalyst solution is added in the direction of flow of the activate (using lignite coke) in the forward part of the rotary furnace.

In an especially preferred illustrative form the catalyst solution is added in the tap of the rotary furnace.

The activation temperature in the process of the invention in the flow direction of the activate (lignite coke) in the forward part of the rotary furnace can be between 900° and 1045° C., preferably 1000°-1020° C., in the middle part between 905° and 1055° C., prefferably 960°-980° C., and in the rear part between 880° and 995° C., preferably 920°-940° C.

The process of the invention has the advantage that the addition of the amount of catalyst solution intended can be controlled in amount, based on the amount of lignite coke employed.

Advantageously in the process of the invention there are eliminated the filtering and drying steps which are necessary in known activation processes which used the impregnating step.

The process can comprise, consist essentially of, or consist of the recited steps with the stated materials.

DETAILED DESCRIPTION

EXAMPLES 1 AND 2

Lignite coke having the following physical-chemical data set forth in Table 1 was activated in a rotary furnace with steam.

TABLE 1

| Particle Size | mm | 0.5–4.0 |
|---|---|---|
| Particle Composition: | | |
| >4.00 mm | wt. % | — |
| 4.00–3.15 mm | wt. % | 5.0 |
| 3.15–2.00 mm | wt. % | 25.0 |
| 2.00–1.00 mm | wt. % | 48.0 |
| 1.00–0.50 mm | wt. % | 22.0 |
| —<0.50 mm | wt. % | — |
| | | 100.0 |
| Immediate Analysis: | | |
| Water content | wt. % | 2.5 ± 1.5 |
| Ash content | wt. % | 7.0 ± 1.5 |
| Volatile components | wt. % | 3.0 ± 0.5 |
| Fixed carbon | wt. % | 87.5 ± 3.0 |
| Heating value (Hu) | kcal/kg | 7,150 ± 200 |
| | KJ/kg | 30,000 ± 850 |
| Elemental Analysis (waf): | | |
| Carbon | wt. % | 88.2 ± 1.0 |
| Hydrogen | wt. % | 0.6 ± 0.2 |
| Sulfur | wt. % | 0.4 ± 0.15 |
| Oxygen | wt. % | } 0.8 ± 0.4 |
| Nitrogen | wt. % | |
| Oxide Analysis of the Coke Ash: | | |
| $SiO_2$ | wt. % | 6.0 ± 4.0 |
| $Al_2O_3$ | wt. % | 6.0 ± 3.0 |
| $Fe_2O_3$ | wt. % | 16.0 ± 8.0 |
| $SO_3$ | wt. % | 16.0 ± 4.0 |
| CaO | wt. % | 37.5 ± 7.5 |
| MgO | wt. % | 16.0 ± 4.0 |
| $Na_2O$ | wt. % | } 2.5 ± 1.0 |
| $K_2O$ | wt. % | |
| Physical Characteristics: | | |
| True density | wt. % | 1.75 ± 0.1 |
| Bulk density | g/cm$^3$ | 0.50 ± 0.05 |
| Specific surface area | M$^2$/g | 200 ± 50 |
| Reactivity | cm$^3$CO$_2$/g. sec. | 2.8 |
| Electrical resistance | Ohm · cm | 0.25 |
| Ignition point | °C. | 320 ± 20 |
| Crushing strength | daN/cm$^2$ | — |
| Ash Melting Behavior In Weakly Reducing Atmosphere | | |
| Sintering point | °C. | ca. 1,050 |
| Softening point | °C. | ca. 1,440 |
| Hemispherical point | °C. | ca. 1,560 |
| Melting point | °C. | ca. 1,620 |

There was added as catalyst aqueous potassium carbonate or aqueous potassium hydroxide solution via a lance equipped with a unary nozzle and located at the head of rotary tube furnace. The finished activate was discharged via a trumpet tube in the direction of flow of the activate (lignite coke) at the rear end. There was employed liquified gas (propane/butane) as fuel gases.

The individual data of the examples are set forth in Table 2.

The stated data refer to the activated carbon water washed activated carbon having an ash content of 10 to 15 wt.%.:

TABLE 2

| | Example 1 | Example 2 | Example 3 | Example 4 | Activation in Rotary Furnace |
|---|---|---|---|---|---|
| Coal throughput kg/h | 300 | 500 | 300 | 400 | |
| Catalyst | 25% ig K$_2$CO$_3$ | 25% ig K$_2$CO$_3$ | 50% KOH | 50% KOH | aqueous soluton wt. % |
| Cat. Concentration wt. % | 5.2 | 3.4 | 5.0 | 5.0 | based on the coal employed |
| Potassium Concentration wt. % | 2.9 | 1.9 | 3.5 | 3.5 | based on the coal employed |
| Type of addition | lance | lance | lance | lance | |
| Furnace-Yield wt. % | 39 | 61 | 43 | 54 | based on the unwashed activated carbon |
| Furnace Temperature °C. | | | | | |
| T$_1$ | 990(975–1005) | 950(900–1005) | 1000–1020 | 1005(950–1025) | |
| T$_2$ | 945(925–965) | 990(915–1020) | 960–980 | 955(910–990) | |
| T$_3$ | 935(910–965) | 960(905–985) | 920–940 | 900(825–925) | |
| Average Furnace Temperature °C. | 955 | 970 | 970 | 950 | |

TABLE 2-continued

| | Example 1 | Example 2 | Example 3 | Example 4 | Activiation in Rotary Furnace |
|---|---|---|---|---|---|
| Amount of gas $M^3/h$ | 58 | 60 | 75 | 70 | butane/propane gas in the ratio 8:2 |
| Furnace air amount $m^3/h$ | 500 | 500 | 500 | 500 | |
| Amount of steam kg/h | 700 | 640 | 700 | 650 | |
| Amount of additional air $m^3/h$ | 80 | 80 | 80 | 280 | supplied at the head of the furnace vacuum in the rotary tube |
| Draft (secondary) air) mm water colume | 3.0 | 2.9 | 2.5 | 3.0 | |
| Methylene blue liter ml/0.1 g | 19.5 | 9.5 | 18.5 | 14.5 | Instructions for the test described below |
| Iodine number mg/1.0 g | 1070 | 630 | 1025 | 900 | |
| Molasses number mg | 450 | 680 | 440 | 550 | |
| Benzene load wt. 0% p/po 9/10 | 49.1 | 29.6 | 48.3 | 39.7 | Determination according to v. Kienle/Bader "Aktivkohle and ihre industrielle Anwendung (1980, page 71) |
| 1/10 | 35.5 | 19.8 | 35.0 | 28.5 | |
| 1/100 | 23.9 | 15.6 | 23.2 | 20.1 | |
| Molasses × Iodine/1000 | 482 | 428 | 451 | 495 | |
| Molasses × MBL/10 | 878 | 646 | 814 | 798 | |
| Ash content wt. % | | | 12.7 | | |
| Vibrating density g/l | | | 395 | | |
| Abrasion hardness wt. % | | | 87.4 | | |
| Impact hardness wt. % | | | 71.3 | | |
| Phenol load wt. % | | | | | |
| at 1.0 mg remainder | | | 4.6 | | |
| at 0.1 mg remainder | | | 2.5 | | |

The activated carbons obtained had the following product of the molasses number times the iodine number divided by 1000:
Example 1—482
Example 2—428

The product of the molasses number times the methylene blue number divided by 10 was:
Example 1—878
Example 2—646

EXAMPLES 3 AND 4

Lignite coke, as that employed in Examples 1 and 2 was activated in a rotary tubular furnace with steam.

As catalyst there was added an aqueous potassium hydroxide solution via a lance equipped with a unary nozzle and located at the head of the rotary tube furnace.

The finished activate was discharged via a trumpet tube in the direction of flow of the activate (lignite coke) at the rear end of the rotary tube furnace. There was employed as fuel gas liquified gas (propane/butane).

The individual data are set forth in Table 2.

The stated data refer to the activated carbon water washed under industrial conditions and having an ash content of 10 to 15 wt.%.

The activated carbons obtained had the following product of the molasses number times the iodine number divided by 1000:
Example 3—451
Example 4—495

The product of the molasses number times the methylene blue number divided by 10 was:
Example 3—814
Example 4—798

The determination of the molasses number in Examples 1 to 4 was carried out in the following manner.

Determination of The Decoloration Capacity of Activated Carbon From Molasses (LAT of Sept. 29, 1982)

1. Preliminary Remarks

The decoloration of molasses solution inter alia serves to identify the adsorption capacity of activated carbon provided for use in the liquid phase. The carbon being tested for this purpose is always used in powder form. Granular carbons are ground to a particle size of 100%<0.1 mm, at least 60%<40 μm (Testing sieve DIN 4188, German Industrial Standard 4188). As comparison criterion there is used the decoloration capacity of a standard carbon.

2. Test Molasses

The selection and calibration of a suitable molasses for all parts was taken from LAT. It corresponds to specific requirements in regard to properties and color composition.

3. Standard Carbons

As standard carbons there were used the following carbons in undried condition and they were compared with the carbon being tested:

(a) Main-Standard Carboraffin Wi-La-Me A 167: (Designation Laboratory Ffm); 200 mg dry material (b) Secondary-Standard-Carboraffin: A Carboraffin with the same decoloration capacity calibrated against the main standard.

These standard carbons guaranteed comparability of the results from the different laboratory of the partners of LAT. Fundamentally it can also be based on another standard. However, then the comparability no longer can be furnished.

4. Color Measurement

The decoloration of molasses solution is measured optically. For this purpose there can be used the following apparatus:

(a) Lange-Colorimeter having a 34.4 mm cell and appropriate heat insulated filter. In place of the original-heat insulated filter there can also be used a filter of the glass type KG 3 made by the company Schott & Fen., Mainz, and having a thickness of 5 mm.

(b) the Lange-photometer LP1W having a 4 cm cell an the filter combination given in LB-No. 25330, namely 6+1 mm KG 3
+1.4 mm NG 9
+1 mm BG 38

It is not permissible to use other cell lengths and other filters than those stated since otherwise deviating results are obtained.

5. Standarding the Molasses Solution and Carrying Out the Decoloration 42 grams of test molasses (sugar factory Wabern 1976/77) were weighed out, diluted with distilled water at room temperature, adjusted to pH 7.0±0.1 with 0.1N NaOH or 0.1N HCl and filled up to 1.0 liter. Then there were added 20 ml of a $NaH_2PO_4/Na_2HPO_4$ buffer solution having a pH of 7. The molasses solution after 10 minutes heating to 80°–82° C. in the water bath must have a pH of 7.0±0.1. The solution was subsequently (without further filtration) used to ascertain the decoloration strength of activated carbon.

Hereby the amount of activated carbon fixed upon in each case was stirred in undried condition with 100 ml of the preheated molasses solution in a 300 ml porcelain beaker and held in a thermostat at 80°–82° C. with multiple shaking or stirring. Subsequently the pH of the suspension is determined within 5 minutes after removal from thermostatic water bath with a pH single measuring chain and, if necessary, by addition of 2N NaOH or HCl brought again to the pH 7.0±0.1. The fine adjustment was carried out with 0.1N NaOH or 0.1N HCl.

The temperature of the suspension in the measurement of the pH should be in the region of 70° C. The pH meter is adjusted to the average temperature 75° C. The pH single measuring chain must be suited to insertion in the suspension in this temperature range.

Subsequently the hot solution was filtered through a fluted filter (Firm Schleicher und Schuell No. 602½h) and the filtrate, after the solution had completely run through again poured beak twice over the same filter. After cooling to ≦30° C., the latest after 2 hours, the extinction of the solution was measured. Before the measurement the pH was checked again with random samples, optionally on all adjusted solutions and if necessary, adjusted to pH 7.0±0.1 by further addition of n/10 NaOH or HCl.

For quality control of the molasses used with each activated carbon test there was simultaneously treated a 100 ml sample without use of activated carbon and filtered through fluted filter No. 602½h (Firm Schleicher und Schuell). After the filtration, through which flocculated alkaline earth phosphate in the molasses solution was removed, the solution is absolutely clear. It must have an extinction of 0.76–0.80 in the Lange-Colormeter (layer thickness 34.4 mm heat insulated filter) in order to correspond to the quality requirements (using other cell lengths corresponding to an extinction/cm of 0.22–0.23). If the stated extinction value is not reached when the test molasses weighted portion must be changed.

6. Ascertaining The Molasses Number Via The Molasses Isotherm

To determine the molasses isotherm from each test carbon and the standard carbon there was always measured 5 points, as stated under 5, with e.g. 0.2, 0.4. 0.6, 0.8, and 1.2 grams of activated carbon weighed portion to 100 ml of test solution. Depending on the expected decoloration capacity there can also be selected lower or higher carbon weighed portions.

The evaluation is carried out graphically by entering the measuring point of the test carbon and the standard carbon on double logarithmic coordination paper with the residual extinction as the abscissa criterion and the lead of the activated carbon as the ordinate criterion. The measuring point of each carbon forms nearly a straight line (molasses isotherm). There is determined from the molasses isotherm as stated below, as characteristic values the molasses factor and the molasses number.

Since the amount of color absorbed can only be detected through the extinction of the solution but not by weight, the load is stated simply as:

$$(\Delta E)/g$$

Herein there are the following definitions:
$\Delta E = E_o - E$ = different in extinction
$E_o$ = extinction without activated carbon
$E$ = extinction after the use of activated carbon
$g$ = weight portion of activated carbon, in grams.

To ascertain the molasses factor there is read off the isotherm at an extinction of 0.38 (Lange-Colorimeter)- = Ext/cm of 0.11 the loading of the standard carbon and the test carbon and forms the quotients:

$$\text{Molasses factor} = \frac{\text{loading of the standard carbon}}{\text{Loading of the test carbon}}$$

The correct dimension of the loading using the extinction as measure of concentration is:

$$\text{Landing} = \frac{\Delta E \cdot V}{1 \cdot g}$$

The Freundlich isotherm equation:

$$\frac{\Delta E \cdot V}{1 \cdot g} = K \cdot E^n$$

is approximately valid for the molasses isotherm,
Here the terms have the following meanings:
V = solution volume
l = length of cell
K = constant of the Freundlich equation
n = exponent of the Freundlich equation Since test carbon and standard carbon are measured under the same conditions (solution volume, cell length), in the determination of the molasses factor or value there can be eliminated l and V. Therefore, it is permissible to simply state the loading as $$(\Delta E)/g$$

The molasses number is obtained by multiplication of the molasses factor with the standard carbon weighed portion (mg):

Molasses number = Molasses factor × 200 mg

The molasses number states how many milligrams of the activated carbon being tested are rewquired to attain the same degree of decoloration o the same molasses as with 200 mg of the main standard activated carbon.

The determination of the iodine number in Examples 1 to 4 is carried out in the following manner:

There is determined the amount of iodine which is absorbed from an aqueous iodine solution under specific conditions by 1 gram of activated carbon. The value obtained is a measure of the total effective surface area of the activated carbon.

EXAMPLE 10 grams of activated carbon were pulverized in a laboratory mill to such an extent that 80–90% passed through a 40 μm sieve according to DIN 4188. Then it was dried for 3 hours at 150° C. in a drying cabinet. There was weighed out analytically exactly 1 gram of the dried carbon, it was placed in a 250 ml Erlenmeyer-Schliff flask and treated with 10 ml of 5% HCl.

The mixture was heated to boiling and left for 30 seconds at the boiling temperature.

After cooling to room temperature there were added to the flask 100 ml of 0.1N iodine. The flask was closed and shaken intensively for 30 seconds.

After the shaking it was filtered through a dry fluted filter. The residue on the filter was not washed.

The first 20–30 ml of the filtrate were rejected. The remainder of the filtrate was placed in a glass beaker and homogenized with a glass rod.

50 ml of the filtrate were placed in a 250 ml Erlenmeyer flask and titrated with 0.1N $Na_2S_2O_3$ solution until the color of the solution was light yellow.

Then there were added 2 ml of saturated starch solution and the mixture titrated until the disappearance of the blue color.

Calculation: $X = \dfrac{1269 - 27.918 \cdot V}{E}$

X = iodine number in mg iodine/1g activated carbon
E = weighed portion of activated carbon (g)
V = consumption of 0.1N $Na_2S_2O_3$ (ml)

The residual concentration in the solution is calculated as follows (expressed as normality)

$C = \dfrac{0.1 \cdot V}{50} = 0.002 \cdot V$

The residual concentration of the filtrate must be at 0.02N. Otherwise the entire determination must be repeated with another weighed portion. However, there also is the possibility to recalculate to the residual concentration of 0.02N, residual concentrations of 0.008N to 0.035N with the help of correction factors.

The Determination of the Methylene Blue Titer In the Examples (Decoloration of Methylene Blue Solution By Activated Carbon The determination was carried out based on the specification of DAB VII, second supplement 1975.

There was ascertained how many ml of methylene blue solution were completely decolored in a prescribed time with a fixed amount of activated carbon.

For this purpose a methylene blue solution 0.15% (3 g/2l) was produced as follows:

3.0 grams of methylene blue (according to DAB VII) were dissolved in 1000 ml of distilled $H_2O$ in a 2 liter measuring glask and heated for 8 hours at about 40° C. After cooling it was filled up to 2 liters. The solution to be used should have a temperature of about 20° C.

Illustrative Determination 0.1 gram of dry powdery activated carbon was ground in a laboratory mill to such an extent that 80-90% passed through a 40 μm sieve according to DIN 4188 or the 0.1 gram of activated carbon corresponding to commercial activated carbon were weighed out analytically exactly and placed in a 50 ml measuring cylinder having ground-in stoppers.

For exactly 5 minutes there were added portionwise with continuous shaking enough methylene blue solution that complete decoloration occurred.

The milliliters of methylene blue solution then read off is the approximate value of the methylene blue number.

Two further samples having 1 ml less or 1 ml more of the originally found number of ml of the methylene blue solution were shaken for exactly five minutes.

With the first sample complete decoloration should occur while the second should still appear weakly blue.

If both samples are decolorized then in each case they are shaken with 1 ml more of methylene blue solution for 5 minutes until a sample appears still slightly blue.

Then there is determined as the methylene blue titer the number of ml of methylene blue solution which is between the last completely decolorized sample and the first blue appearing sample. It is stated in ml of decolorized 0.15% methylene blue solution per 0.1 g activated carbon.

What is claimed is:

1. A process of producing an activated carbon having the following properties:
   (1) the product of the molasses number times the iodine number divided by 1000 is 350 to 1000,
   (2) the product of the molasses number times the methylene blue titer divided by 10 is 500 to 1200, or
   (3) the product of the molasses number times the iodine number divided by 1000 is 350 to 1000 and the product of molasses number times the methylene blue titer divided by 10 is 500 to 1200, comprising activating lignite coke with steam in a rotary tube and spraying into the rotary tube during the activation phase aqueous alkali carbonate solution, aqueous alkaline earth carbonate solution, aqueous alkali hydroxide solution, aqueous alkaline earth hydroxide or mixtures thereof.

2. A process according to claim 1 wherein the spraying is by means of a lance in the rotary tube.

3. A process according to claim 1 wherein there is used potassium carbonate or potassium hydroxide solution or a mixture thereof.

4. A process according to claim 3 wherein the potassium concentration based on the coke employed is 1.0 to 8.0 weight %.

* * * * *

UNITED STATES PATENT AND TRADEMARK OFFICE
CERTIFICATE OF CORRECTION

PATENT NO. : 4,603,119

DATED : Jul. 29, 1986

INVENTOR(S) : Karl et al

It is certified that error appears in the above-identified patent and that said Letters Patent is hereby corrected as shown below:

[30] Foreign Application Priority Data
    May 16, 1984 [DE] Fed.Rep. of Germany 3418150

Signed and Sealed this

Seventeenth Day of November, 1987

Attest:

DONALD J. QUIGG

*Attesting Officer*  *Commissioner of Patents and Trademarks*